United States Patent
Koishi

(10) Patent No.: US 8,964,070 B2
(45) Date of Patent: Feb. 24, 2015

(54) IMAGE PROCESSING METHOD, IMAGE PROCESSING PROGRAM, IMAGE PROCESSING DEVICE, IMAGE PROCESSING SYSTEM, ELECTRONIC CAMERA AND ELECTRONIC APPARATUS

(75) Inventor: Erika Koishi, Yokohama (JP)

(73) Assignee: Nikon Corporation, Tokyo (JP)

( * ) Notice: Subject to any disclaimer, the term of this patent is extended or adjusted under 35 U.S.C. 154(b) by 955 days.

(21) Appl. No.: 12/452,083

(22) PCT Filed: Jun. 16, 2008

(86) PCT No.: PCT/JP2008/060966
§ 371 (c)(1),
(2), (4) Date: Dec. 15, 2009

(87) PCT Pub. No.: WO2008/156050
PCT Pub. Date: Dec. 24, 2008

(65) Prior Publication Data
US 2010/0134643 A1 Jun. 3, 2010

(30) Foreign Application Priority Data
Jun. 21, 2007 (JP) .................................. 2007-163986

(51) Int. Cl.
*H04N 9/64* (2006.01)
*H04N 3/14* (2006.01)
*H04N 9/31* (2006.01)
*G03B 29/00* (2006.01)
*H04N 9/67* (2006.01)

(52) U.S. Cl.
CPC .............. *H04N 9/3197* (2013.01); *G03B 29/00* (2013.01); *H04N 9/3176* (2013.01); *H04N 9/3182* (2013.01); *H04N 9/3194* (2013.01); *H04N 9/67* (2013.01)
USPC ...................................... 348/251; 348/333.01

(58) Field of Classification Search
USPC ................................................ 353/31, 34, 48
See application file for complete search history.

(56) References Cited

U.S. PATENT DOCUMENTS 5,557,366 A * 9/1996 Hirai et al. ..................... 396/159
2002/0024640 A1* 2/2002 Ioka ................................ 353/94

(Continued)

FOREIGN PATENT DOCUMENTS

JP    A-04-053374    2/1992
JP    H09-6957 A    1/1997

(Continued)

OTHER PUBLICATIONS

International Search Report issued in International Application No. PCT/JP2008/060966; Mailed on Sep. 2, 2008.

(Continued)

*Primary Examiner* — Lin Ye
*Assistant Examiner* — Euel Cowan
(74) *Attorney, Agent, or Firm* — Oliff PLC

(57) ABSTRACT

An electronic apparatus includes: a projection unit that projects a projection-target original image onto a projection surface; an imaging unit that captures an image of the projection surface onto which an image is projected by the projection unit; and a control unit that analyzes the photographic image of the projection surface captured by the imaging unit and adjusts a correction quantity representing an extent to which the projection-target original image is to be corrected based upon analysis results.

4 Claims, 13 Drawing Sheets

(56) References Cited

U.S. PATENT DOCUMENTS

Figure 1:
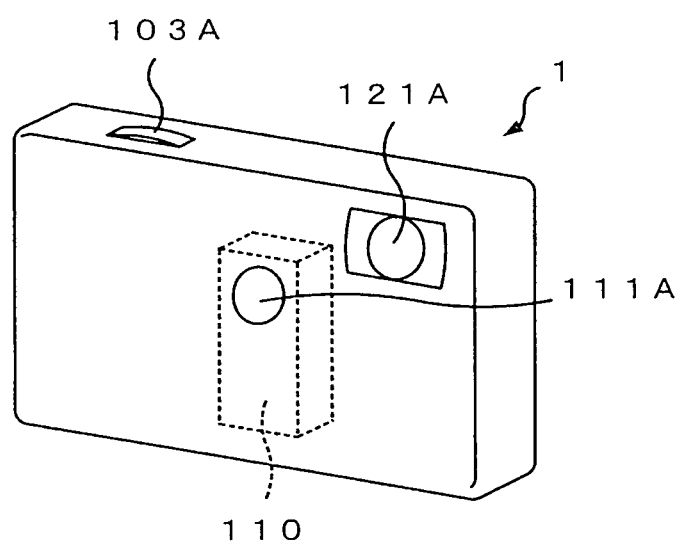

| | | | |
|---|---|---|---|
| 2003/0020974 A1 | 1/2003 | Matsushima | |
| 2004/0140981 A1* | 7/2004 | Clark | 345/600 |
| 2004/0196303 A1 | 10/2004 | Matsuda | |
| 2005/0190986 A1* | 9/2005 | Sakurai | 382/275 |
| 2006/0187476 A1 | 8/2006 | Yamada | |
| 2007/0171646 A1* | 7/2007 | Kojima | 362/268 |

FOREIGN PATENT DOCUMENTS

| | | | |
|---|---|---|---|
| JP | A-2002-369004 | | 12/2002 |
| JP | 2004-053477 A | | 2/2004 |
| JP | A-2004-085914 | | 3/2004 |
| JP | A-2004-109246 | | 4/2004 |
| JP | 2004-158941 | * | 6/2004 |
| JP | A-2004-158941 | | 6/2004 |
| JP | A-2004-229290 | | 8/2004 |
| JP | 2005-124133 A | | 5/2005 |
| JP | A-2005-181731 | | 7/2005 |
| JP | A-2005-354171 | | 12/2005 |
| JP | A-2006-026183 | | 2/2006 |
| JP | A-2006-064859 | | 3/2006 |
| JP | A-2006-078963 | | 3/2006 |
| JP | A-2006-128986 | | 5/2006 |
| JP | A-2006-165843 | | 6/2006 |
| JP | A-2006-222858 | | 8/2006 |
| JP | 2006-235374 A | | 9/2006 |
| JP | A-2006-235158 | | 9/2006 |
| JP | A-2006-279920 | | 10/2006 |
| JP | A-2006-323139 | | 11/2006 |
| JP | A-2007-074212 | | 3/2007 |
| JP | 2007-088980 A | | 4/2007 |
| JP | A-2007-104267 | | 4/2007 |
| JP | A-2007-304284 | | 11/2007 |

OTHER PUBLICATIONS

Feb. 12, 2013 Japanese Office Action issued in JP 2009-520471 (with English-language Translation).

Oct. 8, 2013 Office Action issued in Japanese Patent Application No. 2009-520471 w/translation.

* cited by examiner (b)

(c)

(d)

IMAGE PROCESSING METHOD, IMAGE PROCESSING PROGRAM, IMAGE PROCESSING DEVICE, IMAGE PROCESSING SYSTEM, ELECTRONIC CAMERA AND ELECTRONIC APPARATUS

TECHNICAL FIELD

The present invention relates to an image processing method that may be adopted when processing a projection image, an image processing program based upon which image processing adopting the image processing method is executed, an image processing device that executes image processing through the image processing method and an electronic camera and an electronic apparatus equipped with the image processing device.

BACKGROUND ART

An image may be projected via a projector onto a projection surface assuming varying levels of reflectance or a patterned projection surface, with inconsistent illumination provided at the projector, or with the illumination conditions in the surrounding environment significantly affecting the projected image. Under such circumstances, the pattern or the irregularities on the projection surface will be superimposed over the projection image and thus the projection image will not be properly displayed. Patent reference 1 discloses a technology for correcting a projection image by photographing the projection surface and adjusting the dynamic range of the projection image to a range equal to or less than the lowest brightness within the photographed projection surface image, in order to cancel out the adverse effect of the non-uniform illumination and the like and thus enable accurate display of the projection image. Patent reference 1: Japanese Laid Open Patent Publication No. 2004-158941

DISCLOSURE OF THE INVENTION

Problems to be Solved by the Invention

There is still an issue that must be addressed in that if the projection surface includes an extremely dark (very low brightness level) area or a highly chromatic area, the presence of this area affects the correction results, since the dynamic range for the entire projection image is bound to be set to very low, which leads to loss of visual detail.

Means for Solving the Problems

According to the 1st aspect of the present invention, an electronic apparatus comprises: a projection unit that projects a projection-target original image onto a projection surface; an imaging unit that captures an image of the projection surface onto which an image is projected by the projection unit; and a control unit that analyzes the photographic image of the projection surface captured by the imaging unit and adjusts a correction quantity representing an extent to which the projection-target original image is to be corrected based upon analysis results.

According to the 2nd aspect of the present invention, an electronic apparatus comprises: a projection unit that projects a test image and a projection-target original image onto a projection surface; an imaging unit that captures an image of the projection surface onto which one of the test image and the projection-target original image is projected by the projection unit; and a control unit that analyzes a photographic image of the test image captured by the imaging unit and adjusts a correction quantity representing an extent to which the projection-target original image is to be corrected based upon analysis results, wherein: the projection unit projects the projection-target original image corrected based upon the correction quantity having been adjusted by the control unit.

The control unit analyzes at least one of a distribution of pixel values within a plane of the photographic image and a frequency distribution of the pixel values. Moreover, it is preferred that the control unit calculates one of brightness values and chromaticity values based upon the pixel values indicated in the photographic image and adjusts the correction quantity for the projection-target original image based upon results obtained by analyzing at least one of a distribution of the brightness values within the image plane and a frequency distribution of the brightness values, and a distribution of the chromaticity values within the image plane and a frequency distribution of the chromaticity values. The control unit adjusts the correction quantity for the projection-target original image by using one of pixel values equal to or greater than a minimum threshold value for the brightness values in the photographic image and pixel values equal to or less than a maximum threshold value for the chromaticity values in the photographic image. The minimum threshold value corresponds to a predetermined ratio set in reference to a largest brightness value obtained from the photographic image. Furthermore, the minimum threshold value may match one of the brightness value and the chromaticity value corresponding to a predetermined number of pixels, a count thereof starting with a pixel indicating one of a lowest brightness value and a lowest chromaticity value in the photographic image toward a pixel indicating one of a highest brightness value and a highest chromaticity value or a count thereof starting with the pixel indicating one of the highest brightness value and the highest chromaticity value in the photographic image toward the pixel indicating one of the lowest brightness value and the lowest chromaticity value.

The control unit according to the present invention adjusts a weight applied to each pixel in correspondence to a distance to the pixel from one of a specific point and a specific area in the image, when using pixel values indicated in the photographic image in adjustment of the correction quantity for the projection-target original image. Moreover, if a portion of the photographic image indicating one of a low pixel value and a low brightness value corresponds to an area of the projection-target original image indicating one of a low pixel value and a low brightness value, the control unit may not use the portion of the photographic image indicating one of the low pixel value and the low brightness value in adjustment of the correction quantity for the projection-target original image. It is preferred that the control unit adjusts the correction quantity for the projection-target original image based upon at least one of an ambient light level, a projection luminance set at the projection unit and the projection-target original image. The control unit adjusts at least one of the minimum threshold value and a projection luminance setting at the projection unit based upon an ambient light level. Furthermore, the control unit executes correction for each pixel at the projection surface or divides a projection image into a plurality of separate areas, and executes correction for each pixel or for each of the plurality of areas. It is preferred that the control unit also analyzes a pixel value distribution with regard to pixel values indicated in the projection-target original image and executes correction for each pixel or for each area based upon analysis results.

An electronic camera according to the present invention is equipped with an electronic apparatus described above.

According to the 2nd aspect of the present invention, an image processing method comprises: analyzing a photographic image obtained by capturing an image of a projection surface onto which a specific projection image is projected; and adjusting a correction quantity representing an extent to which a projection-target original image is to be corrected based upon analysis results.

An image processing program according to the present invention enables a computer to execute an image processing method described above.

An image processing device according to the present invention is installed therein an image processing program described above.

An image processing system according to the present invention comprises: a computer that executes an image processing method described above; a projection device that projects a projection image; and a camera that captures an image projected by the projection device.

Effect of the Invention

According to the present invention, a desirable projection image assuming a high dynamic range, in which inconsistency in the reflectance at the projection surface or the like remains substantially unnoticeable, is obtained.

BRIEF DESCRIPTION OF DRAWINGS (FIG. 1) An external view of a camera with projection capability achieved in an embodiment of the present invention;

(FIG. 2) A block diagram showing the structure adopted in the camera with projection capability achieved in the embodiment of the present invention;

(FIG. 3) Illustrations pertaining to a projection image provided for viewing by projecting a projection image having undergone the image processing executed in the embodiment of the present invention;

(FIG. 4) A flowchart of the image processing executed in the embodiment of the present invention;

(FIG. 5) An illustration of a patterned projection surface;

(FIG. 6) A highest brightness distribution that may be observed by projecting a white image;

(FIG. 7) A lowest brightness distribution that may be observed by projecting a black image;

(FIG. 8) Illustrations pertaining to the image processing executed in alternative embodiment 4;

(FIG. 9) A flowchart of the image processing executed in alternative embodiment 4 of the present invention;

(FIG. 10) A chart indicating how $Y_{MIN, th}$ may be set relative to the ambient light level;

(FIG. 11) A chart indicating how the luminance $L_{device}$ may be adjusted relative to the ambient light level;

(FIG. 12) A flowchart of the chromaticity correction executed in alternative embodiment 6;

(FIG. 13) A flowchart of the chromaticity correction executed in alternative embodiment 6.

BEST MODE FOR CARRYING OUT THE INVENTION

The following is a description of an embodiment of the present invention, given in reference to drawings. FIG. 1 shows a camera 1 equipped with projection capability achieved in the embodiment of the present invention, viewed from the front side. At the front surface of the camera with projection capability 1 in FIG. 1, a photographic lens 121A constituting an imaging optical system 121 (not shown, see FIG. 2) and a projection lens 111A constituting a projection optical system 111 (not shown, see FIG. 2) are disposed. The camera with projection capability 1, set on a desktop or the like or on a cradle (not shown), projects projection information such as an image via a built-in projection unit 110 (projector) toward a screen or the like present to the front. A shutter release switch 103A is disposed at the top surface of the camera with projection capability 1. The projection optical system 111 in the projection unit 110 is disposed with a vertical orientation at the camera with projection capability 1.

Figure 2:
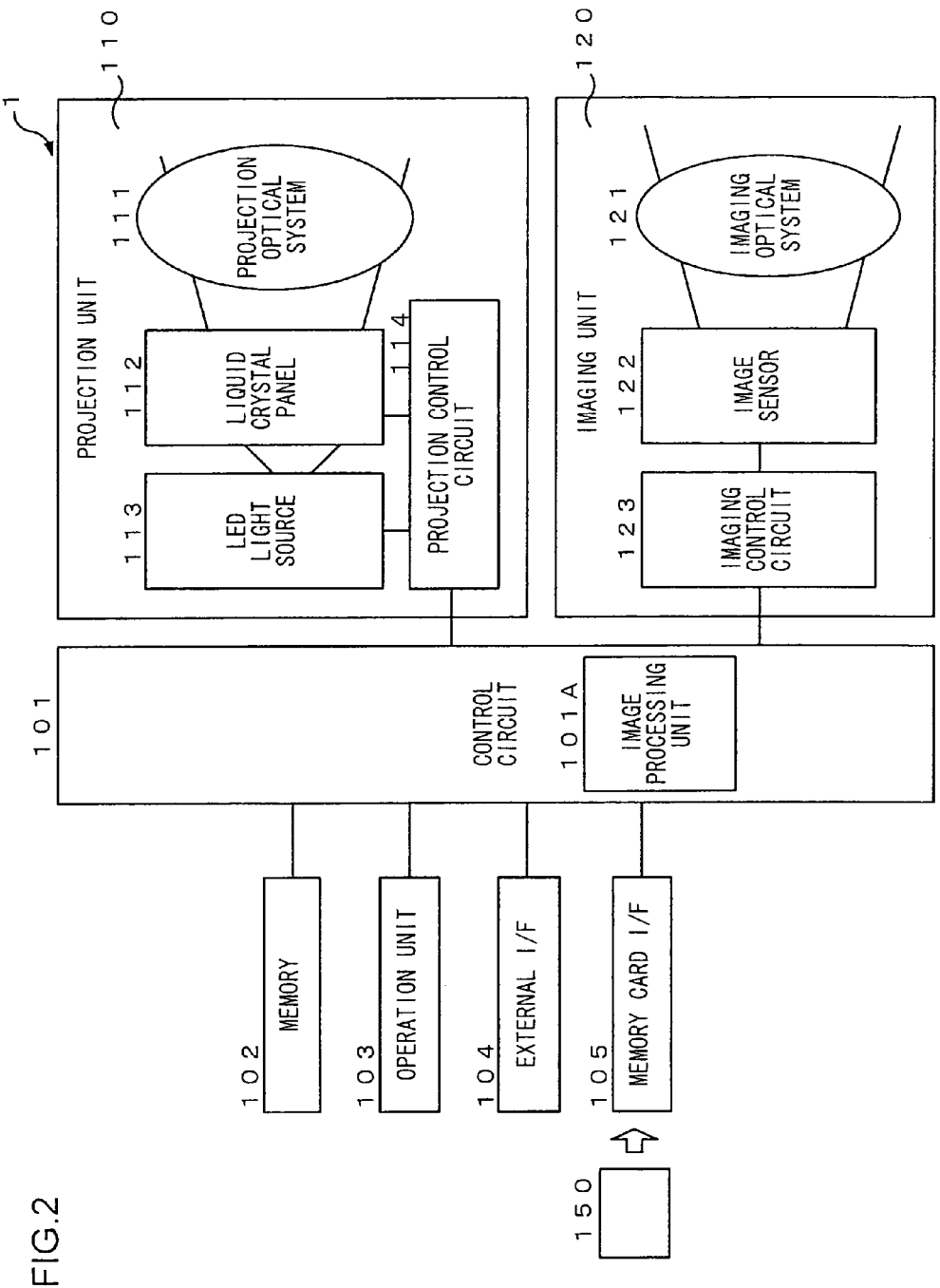

FIG. 2 is a block diagram showing the structure adopted in the camera with projection capability 1. As shown in FIG. 2, at the camera with projection capability 1, including the projection unit 110, an imaging unit 120, a control circuit 101, a memory 102, an operation unit 103, an external interface (I/F) circuit 104 and a memory card interface (I/F) 105, a memory card 150 is connected to the memory card interface 105.

The control circuit 101 is constituted with a microprocessor and its peripheral circuits. Based upon a control program, the control circuit 101 executes specific arithmetic operations by using signals input thereto from various internal units constituting the camera with projection capability. The control circuit 101 then outputs the arithmetic operation results as control signals to the individual internal units in the camera with projection capability, so as to control projection operation and photographing operation executed in the camera with projection capability 1. It is to be noted that the control program is stored in a ROM (not shown) in the control circuit 101.

The control circuit 101 includes an image processing unit 101A. The image processing unit 101A executes image processing on image data obtained via the external interface 104 or image data obtained through the memory card 150. The image processing executed by the image processing unit 101A is to be described in detail later.

The memory 102 is used as a work memory by the control circuit 101. The operation unit 103, which includes the shutter release switch 103A, outputs an operation signal corresponding to a specific button or switch having been operated to the control circuit 101. In response to an instruction issued by the control circuit 101, a data write, a data save and or a data read can be executed at the memory card 150.

The projection unit 110 includes the projection optical system 111, a liquid crystal panel 112, an LED light source 113 and a projection control circuit 114. The LED light source 113 illuminates the liquid crystal panel 112 with a light level corresponding to the electrical current supplied thereto. At the liquid crystal panel 112, an optical image is generated in response to a drive signal provided from the projection control circuit 114. The optical image emitted from the liquid crystal panel 112 is projected by the projection optical system 111. In response to an instruction issued by the control circuit 101, the projection control circuit 114 outputs a control signal to the LED light source 113 and the liquid crystal panel 112.

The projection unit 110, assuming a structure that enables it to project an image expressed with image data provided thereto from an external apparatus via the external interface circuit 104 as well as an image expressed with image data saved in the memory card 150, projects an image indicated by the control circuit 101. In the following description, images expressed with image data saved in the memory card 150 and images expressed with image data provided from external apparatuses via the external interface circuit 104 are each referred to as a projection-target original image.

The imaging unit 120, which includes the imaging optical system 121, an image sensor 122 and an imaging control circuit 123, captures an image of the projection surface in response to an instruction issued by the control circuit 101. The imaging optical system 121 forms a subject image onto the imaging surface of the image sensor 122. The image sensor 122 may be constituted with a CCD image sensor or a CMOS image sensor. In response to instructions issued by the control circuit 101, the imaging control circuit 123 controls drive of the image sensor 122 and executes a specific type of signal processing on image signals output from the image sensor 122. Image data resulting from the signal processing are recorded into the memory card 150 as an image file in a specific format.

The image processing executed by the image processing unit 101A in the control circuit 101 is now described. Color correction is executed for the projection-target original image through the image processing in the embodiment of the present invention. In addition, the image processing unit 101A corrects gating or distortion of the projection image that may occur when the optical axis of the projection optical system 111 is not perpendicular to the projection surface as well as distortion of the projection image caused by misalignment of the optical axis of the projection optical system 111 and the optical axis of the imaging optical system 121 relative to each other. Since the image processing achieved in the embodiment of the present invention is characterized by executing the color correction on an image to be projected, the following explanation focuses on the color correction.

Figure 3:
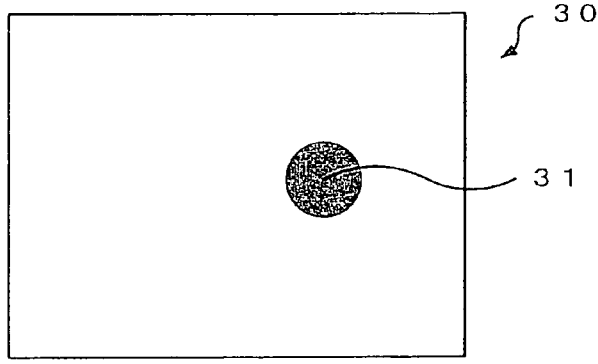
Figure 3:
Figure 3:
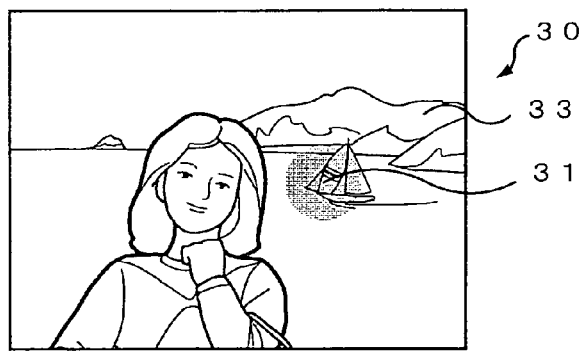
Figure 3:
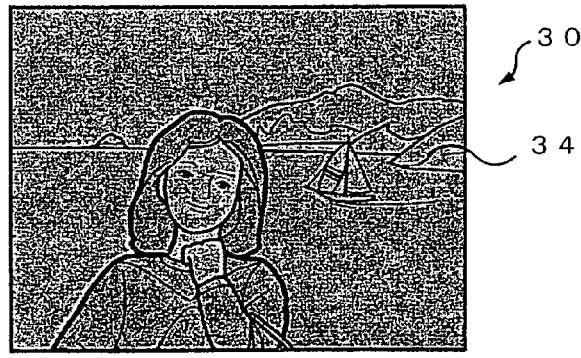

In reference to FIG. 3, a projection image that may be provided for viewing by executing the image processing achieved in the embodiment of the present invention on a projection-target original image and projecting the projection image resulting from the processing is described. FIG. 3(*a*) illustrates a projection surface 30 onto which the projection image is projected. It is assumed that a round stain 31 is present on the projection surface 30. FIG. 3(*b*) shows a projection-target original image 32 to be projected onto the projection surface 30. FIG. 3(*c*) shows a projection image 33 provided for viewing by projecting a projection image resulting from the image processing achieved in the embodiment of the present invention, executed on the projection-target original image 32, onto the projection surface 30. The projection image 33 assures a good quality image without allowing the stain 31 to stand out. FIG. 3(*d*) shows a projection image 34 that will be provided for viewing through image processing of the related art, i.e., by projecting a projection image resulting from image processing executed on the projection-target original image 32 so as to render the stain 31 completely invisible onto the projection surface 30. The stain 31 on the projection surface 30 is completely invisible in the projection image 34. However, the dynamic range of the projection image 34 has become very low, resulting in poor quality of the projection image 34.

Figure 4:
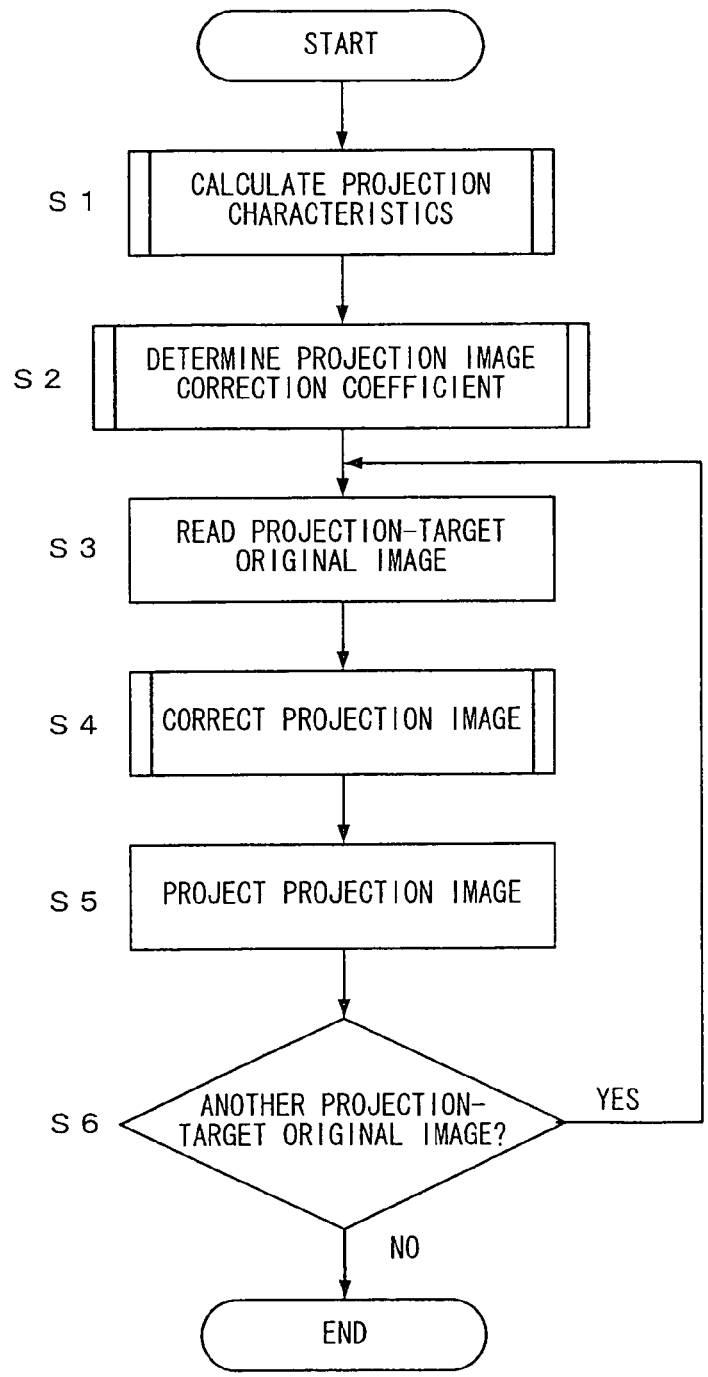

In reference to the flowchart presented in FIG. 4, the image processing executed in the embodiment of the present invention is described. Through this image processing, the visibility of any patterns, stains or the like on the wall or the like, onto which the projection image is projected, is greatly reduced in the projection image and, at the same time, the projection-target original image is corrected to an optimal correction extent so as to ensure that the dynamic range of the projection image never becomes too low. The processing in FIG. 4 is executed by the control circuit 101 based upon a program started up as projection start processing commences at the camera with projection capability 1.

In step S1, the projection characteristics of the projection unit 110 are calculated. The term "projection characteristics" in this context refers to the relationship between the pixel values (R,G,B) indicated in the input image and colorimetric values (X,Y,Z) indicating the color reproduced on the projection surface, observed by factoring in any inconsistency in the illumination at the projection unit 110, the color of the projection surface, any patterns that may be present on the projection surface, the ambient light conditions affecting the projection surface and the like. The projection characteristics are calculated by photographing, with the photographing unit 120, a specific projection image projected by the projection unit 110 and detecting colorimetric values from the photographed image.

In step S2, a correction coefficient for the projection image is determined. The correction coefficient is determined based upon the projection characteristics having been calculated in step 1 and is applied to the input image so as to ensure that the appearance of the projected image closely resembles the appearance of the input image (projection-target original image). The projection image correction coefficient is determined by photographing with the photographing unit 120 the specific projection image projected by the projection unit 110 and analyzing the photographed image. This correction coefficient represents a correction quantity indicating the extent to which the projection-target original image is to be corrected. This processing, too, is to be described in detail later.

In step S3, the projection-target original image is read via the external interface circuit 104 or from the memory card 150 and the projection-target original image thus read is stored into the memory 102.

In step S4, the projection-target original image having been read in step S3 is corrected with the correction coefficient having been determined in step S2.

In step S5, the projection image having been corrected in step S4 undergoes analog conversion and the projection image resulting from the conversion is projected.

In step S6, a decision is made as to whether or not another projection-target original image is to be projected. An affirmative decision is made in step S6 if another projection-target original image is to be projected next and, in this case, the operation returns to step S3. However, a negative decision is made in step S6 if there is no more projection-target original images to be projected, and in such a case, the processing ends.

Next, the processing executed in steps S1, S2 and S4 is described in further detail.

—Determining Projection Characteristics—

The projection characteristics calculation executed in step S1 is now described.

When an image expressed with image data indicating pixel values $(R,G,B)_i$ for an ith pixel is projected by the projection unit 110, a relationship expressed in the following relational expression exists between the pixel values and colorimetric values $(X,Y,Z)_i$ measured at the projection surface at the position corresponding to the ith pixel. In the expression, $\gamma$ represents the gradation characteristics assumed at the projection unit 110 and $M_{pi}$ represents the color conversion matrix (with "i" subscripted to factor in any inconsistent illumination at the projection unit 110) based upon which pixel values $(R^\gamma G^\gamma B^\gamma)_i$ at the projection unit 110 are converted to colorimetric values corresponding to the illumination at the projection unit 110. $(X_{kp}, Y_{kp}, Z_{kp})_i$ represents the illumination conditions (with "i" subscripted to factor in the ambient light levels and in-plane irregularities such as dark spots) that include the ambient light conditions when black is projected via the projection unit 110, whereas $R_i$ represents the reflectance characteristics (with "i" subscripted to factor in any inconsistency in the reflectance attributable to, for instance, a pattern present on the projection surface) manifesting at the projection surface.

$$\begin{bmatrix} X \\ Y \\ Z \end{bmatrix}_i = R_i \cdot \left[ M_{pi} \cdot \left( \begin{bmatrix} R^\gamma \\ G^\gamma \\ B^\gamma \end{bmatrix}_i + \begin{bmatrix} X_{kp} \\ Y_{kp} \\ Z_{kp} \end{bmatrix}_i \right) \right] \quad (1)$$

$$= M_i \cdot \begin{bmatrix} R^\gamma \\ G^\gamma \\ B^\gamma \end{bmatrix}_i + \begin{bmatrix} X_k \\ Y_k \\ Z_k \end{bmatrix}_i$$

when $$M_i = R_i \cdot M_{pi} \quad (2)$$

$$\begin{bmatrix} X_k \\ Y_k \\ Z_k \end{bmatrix}_i = R_i \cdot \begin{bmatrix} X_{kp} \\ Y_{kp} \\ Z_{kp} \end{bmatrix}_i$$

Based upon the photographic image obtained by photographing the projection surface onto which a black image $((RGB)_i=(0, 0, 0)_i)$ is projected, $(X_k Y_k Z_k)_i$ are determined. It is to be noted that the colorimetric values at the projection surface can be calculated through a predetermined type of color conversion processing based upon the pixel values indicated in the photographic image. Assuming that the image is profiled in the sRGB system, $(X_k Y_k Z_k)_i$ can be determined through standard sRGB conversion processing.

Likewise, the 3×3 matrix coefficients in a color conversion matrix $M_i$ is determined based upon photographic images obtained by photographing the projection surface onto which an R image $((RGB)_i=(1,0,0))$, a G image $((RGB)_i=(0,1,0))$ and a B image $((RGB)_i=(0,0,1))$ are individually projected. In more specific terms, assuming that the colorimetric values calculated for the projection surface onto which the R image, the G image and the B image are projected are respectively expressed as $(X_r Y_r Z_r)$, $(X_g Y_g Z_g)$ and $(X_b Y_b Z_b)$, the color conversion matrix $M_i$ is expressed as follows.

$$M_i = \begin{bmatrix} X_r - X_k & X_g - X_k & X_b - X_k \\ Y_r - Y_k & Y_g - Y_k & Y_b - Y_k \\ Z_r - Z_k & Z_g - Z_k & Z_b - Z_k \end{bmatrix}_i \quad (3)$$

Namely, the 3×3 matrix coefficients in the color conversion matrix $M_i$ are determined based upon the photographic images obtained by photographing the projection surface onto which specific test images (the black image, the R image, the G image and the B image) are projected.

It is to be noted that while the description above is given by assuming that the pixels constituting an image captured at the imaging unit 120 and the pixels constituting an image projected via the projection unit 110 are arrayed in matching positional arrangements and that the pixels assume a uniform pixel size, however, if the pixel positions/sizes may not match, pixel values each calculated through interpolation for a specific corresponding pixel position should be used. In addition, the area over which the projection image is projected may be detected by detecting the corners of the projection image and the position of and the range over which the image portion indicating the ith pixel values is projected may be detected accordingly.

—Determining Projection Image Correction Coefficient—

The processing executed in step S2 to determine the projection image correction coefficient is now described.

If any irregularity (may be attributable to inconsistency in the reflectance at the projection surface or uneven illumination of the projection surface; hereafter simply referred to as "irregularities") or a pattern is present on the projection surface, the maximum color gamut over which color can be expressed at the individual pixels at the projection surface changes from one pixel to another, and thus, a specific color gamut range must be determined. Based upon expression (1), the brightness level $Y_i$ at the projection surface may be expressed as follows.

$$Y_i = (Y_r - Y_k) \cdot R_i^\gamma + (Y_g - Y_k) \cdot G_i^\gamma + (Y_b - Y_k) \cdot B_i^\gamma + Y_k \quad (4)$$

Accordingly, a displayable brightness range is determined in correspondence to the range that may be assumed for $Y_i$ in expression (4) $Y_i$ when $R_i$, $G_i$ and $B_i$ in expression (4) remain within the range expressed as $0 \le R_i$, $G_i$, $B_i \le 1$. Since $Y_r$, $Y_g$, $Y_b$, $> Y_k$, the brightness detected when the white image (R,G,B)$_i$=(1, 1, 1)$_i$ is projected, can be designated as the maximum brightness $Y_{MAX, i}$ and the brightness level detected when the black image is projected can be designated as the minimum brightness $Y_{MIN, i}$ under normal circumstances.

Figure 5:
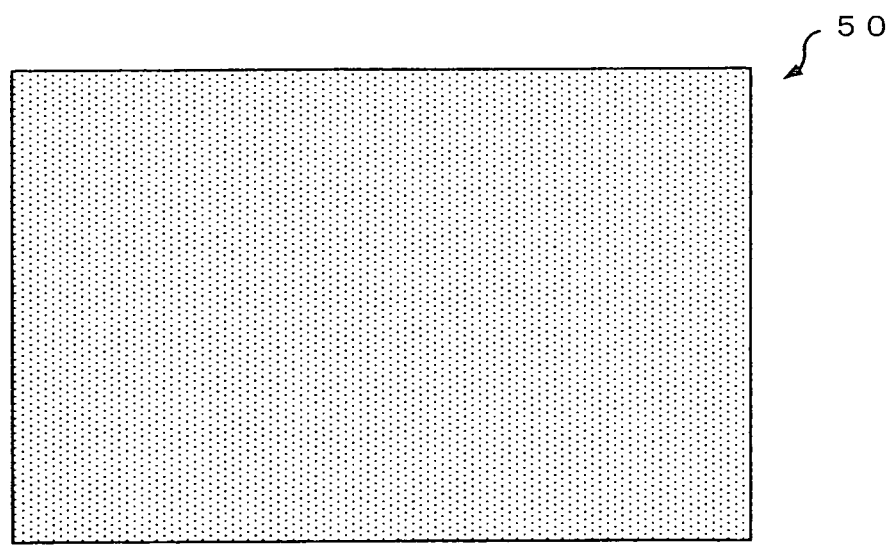
Figure 6:
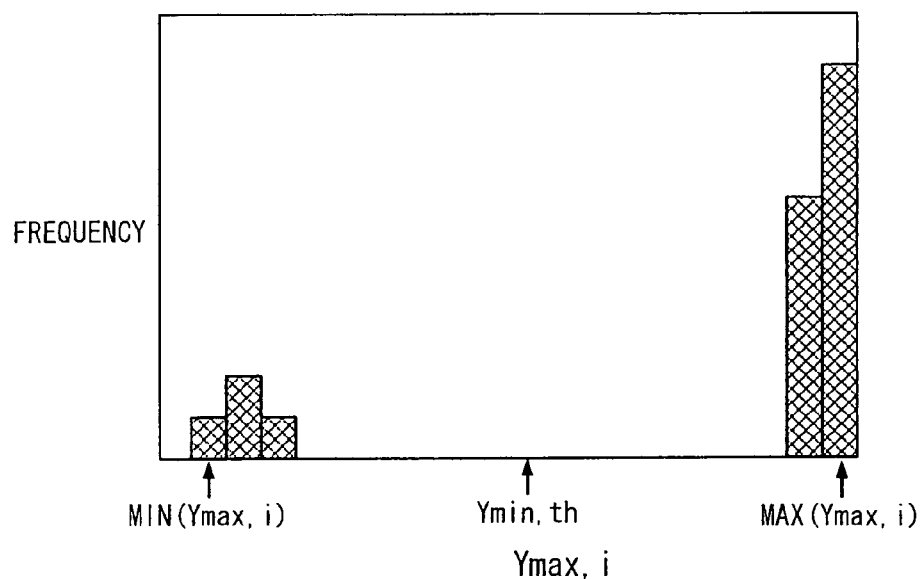
Figure 7:
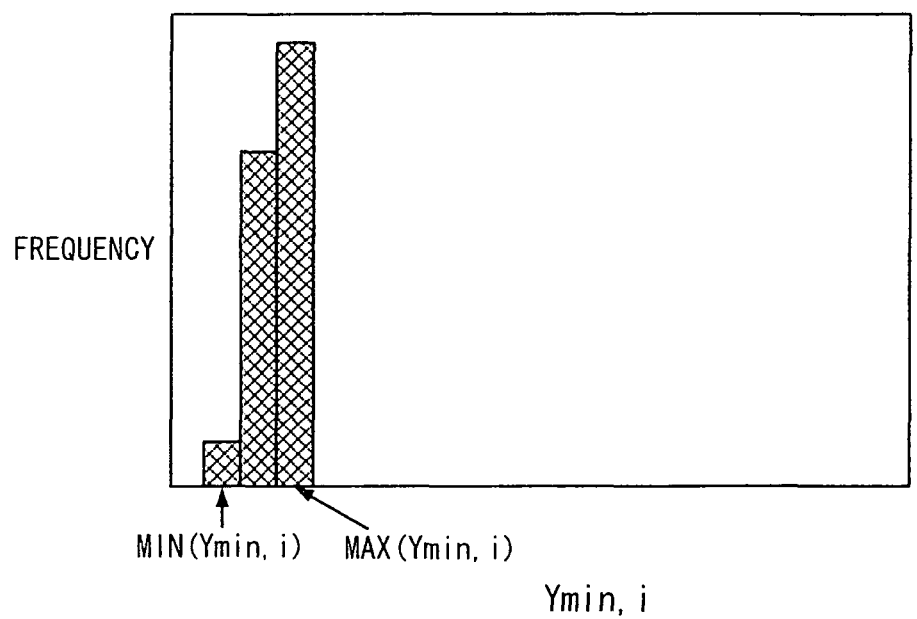

For instance, if a projection surface 50 is patterned so as to include black areas dotting a white surface, as shown in FIG. 5, the frequency distribution of the maximum brightness $Y_{MAX, i}$ and the frequency distribution of the minimum brightness $Y_{MIN, i}$ within the projection surface may be calculated as shown in FIGS. 6 and 7 respectively.

The maximum brightness $Y_{MAX}$ and the minimum brightness $Y_{MIN}$ of the projected image must be respectively corrected to MIN($Y_{MAX, i}$) and MAX($Y_{MIN, i}$) if the projection-target original image is to be corrected so as to completely conceal any irregularity or patterns at the projection surface. However, the dynamic range of such an image will be extremely low, and thus, the appearance of the corrected projection image will be very poor (see FIG. 3(d)). Accordingly, the maximum brightness $Y_{MAX}$ is determined as expressed below by loosening the correction whenever the brightness of a dark area in the projection surface is lower than a predetermined maximum brightness threshold value $Y_{MIN, th}$.

$$Y_{MAX} = \text{MAX}(Y_{MIN, th}, \text{MIN}(Y_{MAX, i})) \quad (5)$$

A uniform value $Y_{CONSTANT}$ ($0 < Y_{CONSTANT} \le 1$) determined in advance to be used conjunction with all images may be used as the maximum brightness threshold value $Y_{MIN, th}$. As an alternative, the brightness value corresponding to a predetermined ratio of pixels counted from the lowest brightness side toward the highest brightness side in the histogram in FIG. 6, the ratio of which to the entire number of pixels assumes a predetermined value, the brightness value corresponding to a predetermined number of pixels counted from the lowest brightness side in the histogram in FIG. 6 or a value representing a predetermined ratio to MAX($Y_{MAX, i}$) may be used as the maximum brightness threshold value $Y_{MIN, th}$. For instance, if the correction needs to be executed for 80% of all the pixels, the threshold value $Y_{MIN, th}$ may be determined by using the brightness value corresponding to pixels counted from the lowest brightness side in the histogram presented in FIG. 6, which accounts for 20%. As a further alternative, the brightness value corresponding to a predetermined ratio of pixels counted from the highest brightness side toward the lowest brightness side in the histogram presented in FIG. 6, the ratio of which to the entire number of pixels assumes a predetermined value, or the brightness value corresponding to a predetermined number of pixels counted from the highest brightness side in the histogram presented in FIG. 6 may be designated as the maximum brightness threshold value $Y_{MIN, th}$.

Figure 10:
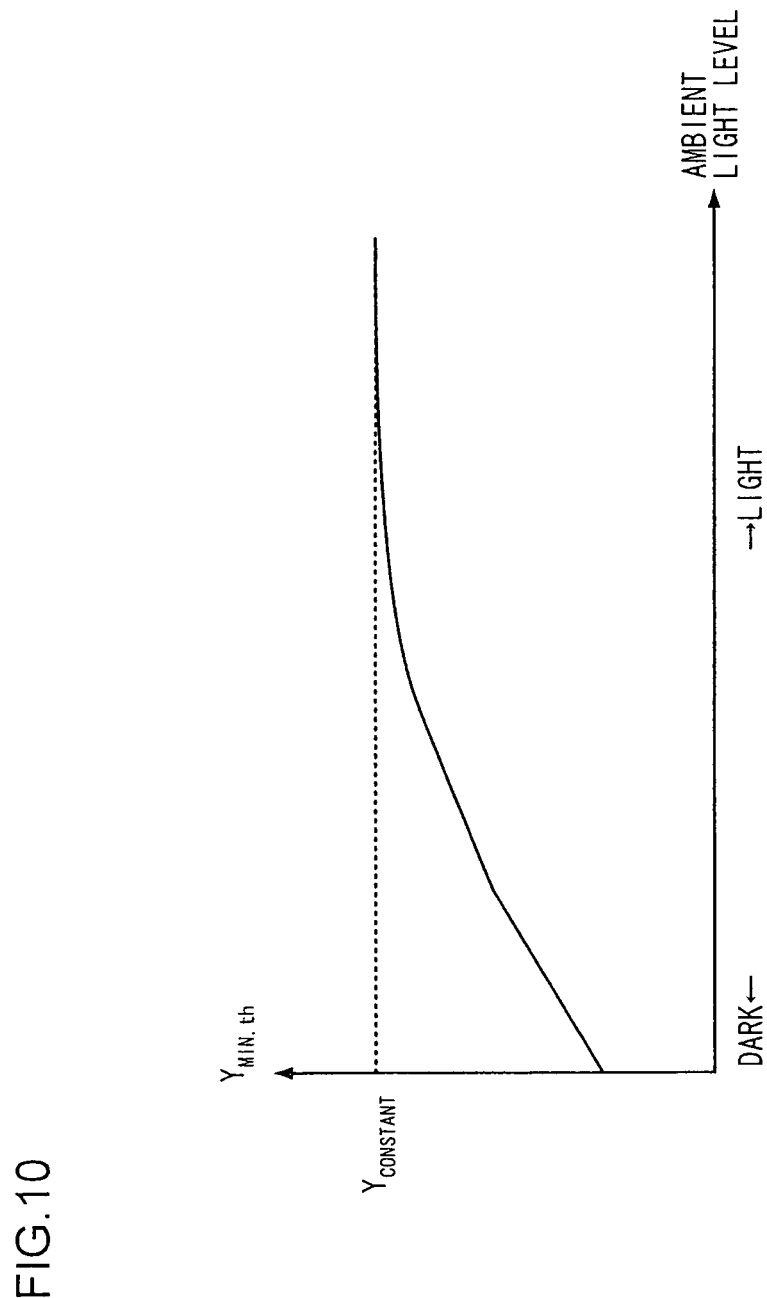

In addition, human visual perception adapts to the brightness in such a manner that an image with a given brightness level appears to be darker when the visual perception is adapted to a higher ambient light level rather than a darker ambient light level. Accordingly, an image achieving an optimal appearance can be provided by adjusting the maximum brightness threshold value $Y_{MIN, th}$ in correspondence to the ambient light level. FIG. 10 presents a chart indicating how $Y_{MIN, th}$ may be set in correspondence to the ambient light level. While $Y_{MIN, th}$ should assume a low setting if the ambient light level is lower than an absolute luminance $L_{device}$ measured by displaying white via the projector, $Y_{MIN, th}$ should assume the predetermined value $Y_{CONSTANT}$, or a value determined based upon the histogram as explained earlier if the ambient light level is equal to or higher than a level equivalent to $L_{device}$. In addition, since the perception of the ambient light level is affected by the ratio of the luminance level at which the projector image is directly viewed (the luminance level detected when the white image is displayed) and the ambient light level, the horizontal axis in FIG. 10 may represent the ratio (ambient light level/projector luminance).

Figure 11:
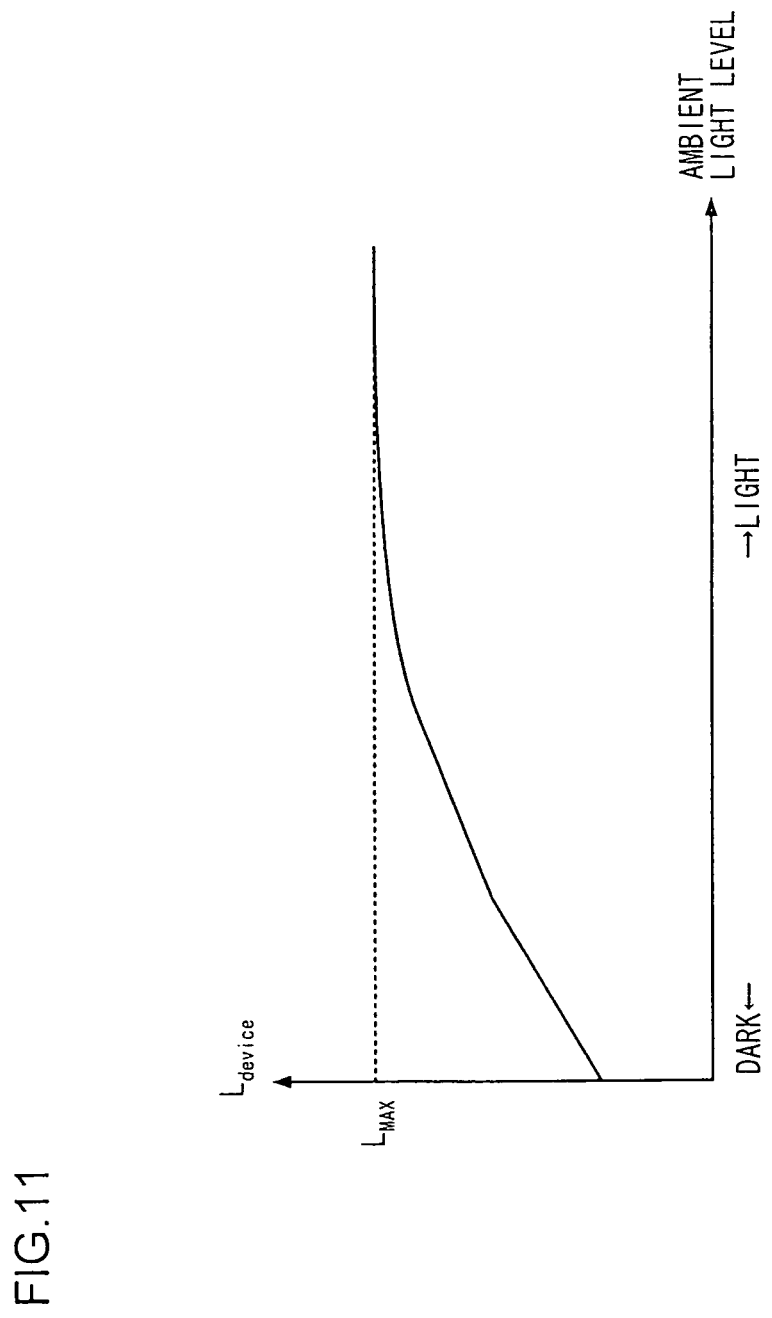

It is to be noted that the description so far has been provided by assuming that the projector luminance is represented by a constant value and that the brightness is simply adjusted based upon the brightness value $Y_{MIN, th}$ relative to white ($R=G=B=1$). However, the adjustment executed based upon $Y_{MIN, th}$ may result in compression of and ultimately destruction of the gradation of the display image. Such adverse effects on the image quality may be minimized by handling the projector display luminance as a variable parameter and adjusting the brightness in conjunction with the luminance $L_{device}$ at the projector. For instance, $Y_{MIN, th}$ may be set to the predetermined value $Y_{CONSTANT}$, or a value determined based upon the histogram as explained earlier and the luminance $L_{device}$ may be adjusted as shown in FIG. 11.

—Correcting Projection Image—

The projection image correction executed in step S4 is now described.

Assuming that the projection-target original image is expressed in the sRGB color space, the colorimetric values $(X,Y,Z)_i$ calculated as indicated below should be assumed at the projection surface in correspondence to the pixel values $(R_0, G_0, B_0)$ indicated in the projection-target original image.

$$\begin{bmatrix} X \\ Y \\ Z \end{bmatrix}_i = (Y_{MAX} - Y_{k0}) \cdot M_{sRGB \to XYZ} \cdot \begin{bmatrix} R_0^{2.2} \\ G_0^{2.2} \\ B_0^{2.2} \end{bmatrix}_i + \begin{bmatrix} X_{k0} \\ Y_{k0} \\ Z_{k0} \end{bmatrix}$$

It is assumed that a black dot $(X_{k0}, Y_{k0}, Z_{k0})$ on the projection surface corresponds to pixel values for which $Y_{MIN}=MAX(Y_{MIN, i})$ is true with regard to the minimum brightness $Y_{MIN, i}$. It is to be noted that $M_{sRGB-XYZ}$ represents a standardized conversion matrix based upon which the sRGB data are converted to XYZ data.

Accordingly, based upon expression (1), the corrected pixel value $(R,G,B)_i$ to be input to the projection unit 110 can be calculated as expressed below.

(1) A pixel for which $Y_{MAX, i} > Y_{MAX}$ is true $$\begin{bmatrix} R^{\gamma} \\ G^{\gamma} \\ B^{\gamma} \end{bmatrix}_i = (M_i)^{-1} \cdot \left[ (Y_{MAX} - Y_{k0}) \cdot M_{sRGB \to XYZ} \cdot \begin{bmatrix} R_0^{2.2} \\ G_0^{2.2} \\ B_0^{2.2} \end{bmatrix}_i + \begin{bmatrix} X_{k0} \\ Y_{k0} \\ Z_{k0} \end{bmatrix} - \begin{bmatrix} X_k \\ Y_k \\ Z_k \end{bmatrix}_i \right] \quad (6)$$

However, if $Y_{MAX, i} < Y_{MAX}$, the brightness of the particular pixel is outside the displayable brightness range and, accordingly, the pixel values should be calculated as expressed below.

(2) A pixel for which $Y_{MAX, i} < Y_{MAX}$ is true $$\begin{bmatrix} R^{\gamma} \\ G^{\gamma} \\ B^{\gamma} \end{bmatrix}_i = (M_i)^{-1} \cdot \left[ (Y_{MAX,i} - Y_{k0}) \cdot M_{sRGB \to XYZ} \cdot \begin{bmatrix} R_0^{2.2} \\ G_0^{2.2} \\ B_0^{2.2} \end{bmatrix}_i + \begin{bmatrix} X_{k0} \\ Y_{k0} \\ Z_{k0} \end{bmatrix} - \begin{bmatrix} X_k \\ Y_k \\ Z_k \end{bmatrix}_i \right] \quad (7)$$

Expressions (6) and (7) are written by assuming that $\gamma=2.2$ in conjunction with the sRGB data for purposes of simplification. However, the pixel values may be calculated by combining $\gamma=2.4$ together with the linear function as indicated in the definition.

The following advantages are achieved through the embodiment described above.

(1) The pixel value distributions (see FIGS. 6 and 7) in photographic images obtained by photographing the projection surface 50, onto which specific test images (a white image and a black image) are projected, are analyzed and the correction quantity indicating the extent to which the projection-target original image is to be corrected is adjusted, (expressions (5), (6) (7)) based upon the analysis results. As a result, even if there is an extremely dark area at the projection surface 50, the correction quantity can be adjusted so as not to darken the projection image excessively, thereby assuring an improvement in the appearance of the projection image.

(2) The brightness value is calculated (expression (4)) based upon the pixel values indicated in a photographic image obtained by photographing the projection surface 50 and then, based upon the results obtained by analyzing the brightness value frequency distribution (see FIGS. 6 and 7), the correction quantity indicating the extent to which the projection-target original image is to be corrected is adjusted. Thus, the correction quantity is adjusted to the optimal value at which stains and the like present on the projection surface are rendered least noticeable in the projection image while allowing the projection image to maintain a high dynamic range.

(3) The correction quantity to be applied in conjunction with the projection-target original image is adjusted based upon pixel values corresponding to brightness values indicated in photographic images obtained by photographing the projection surface 50, with specific test images (a white image and a black image) projected thereupon, with the brightness values being equal to or greater than the minimum threshold value ($Y_{min, th}$). Thus, the correction quantity is adjusted to the optimal value at which stains and the like present on the projection surface are rendered least noticeable in the projection image while allowing the projection image to maintain a high dynamic range.

(4) The minimum threshold value ($Y_{min, th}$) is calculated in correspondence to a predetermined ratio in reference to the maximum brightness value ($Y_{max, i}$) detected from photographic images obtained by photographing the projection surface 50 onto which specific test images (a white image and a black image) are projected. As a result, the optimal minimum threshold value ($Y_{min, th}$) that enables calculation of the optimal correction quantity, at which stains and the like present on the projection surface are rendered least noticeable and the projection image sustains a sufficiently high dynamic range, can be calculated.

(5) The minimum threshold value ($Y_{min, th}$) is calculated as the brightness value corresponding to a predetermined number of pixels starting with the pixel indicating the lowest brightness value (see FIG. 6) and counted toward the pixel indicating the highest brightness value in a photographic image obtained by photographing the projection surface 50 onto which a specific test image (a white image or a black image) is projected. As a result, the optimal minimum threshold value ($Y_{min, th}$) that enables calculation of the optimal correction quantity at which stains and the like present on the projection surface are rendered least noticeable and the projection image sustains a sufficiently high dynamic range, can be calculated.

The embodiment described above allows for the following variations.

Alternative Embodiment 1

In the embodiment of the present invention described above, the pixel values for a correction target pixel for which $Y_{MAX, i} < Y_{MAX}$ is true is calculated within the range in which the color assuming the maximum brightness does not become saturated. Instead, the largest possible value that can be expressed with the correction target pixel may be set as a pixel value for the correction target pixel. For instance, pixel values may be calculated as expressed in (6) for all pixels and any pixel values beyond the input range (e.g., pixel values greater than 255 in conjunction with 8-bit data) may be clipped. In addition, a coefficient by which $M_{sRGB-XYZ}$ is multiplied may be adjusted so as to assume the largest possible value within the range in which color information indicating the largest value among the R color information, the G color information and the B color information calculated as expressed in (6) remains unsaturated.

Alternative Embodiment 2

In the embodiment of the present invention described above, the distribution of the maximum brightness $Y_{MAX, i}$ and the distribution of the minimum brightness $Y_{MIN, i}$ within the projection surface are calculated in step 2. As an alternative, the distribution of the maximum brightness $Y_{MAX, i}$ and the distribution of the minimum brightness $Y_{MIN, i}$ in an area within a predetermined distance from the position on the projection surface equivalent to the center of the projection image (hereafter referred to as the image center) may be calculated without calculating the distribution of the maximum brightness $Y_{MAX, i}$ and the distribution of the minimum brightness $Y_{MIN, i}$ over the area beyond the predetermined distance from the image center. In this case, since the pixel values at a smaller number of pixels need to be detected when calculating the correction quantity, the pixel value distribution analysis can be executed more quickly. While irregularities present on the projection surface will appear in the peripheral area of the image, the user is less likely to be bothered by such peripheral irregularities. The appearance of the projection image as a whole can be improved by assuring greater dynamic range for the entire image, rather than attempting to render the irregularities on the projection surface completely invisible in the peripheral area of the image.

An area within the projection image where a focus match has been achieved or a face has been recognized may be detected and the distribution of the maximum brightness $Y_{MAX, i}$ and the distribution of the minimum brightness $Y_{MIN, i}$ in an area within a predetermined distance from the detected area may be calculated without calculating the distributions of the maximum brightness $Y_{MAX, i}$ and the minimum brightness $Y_{MIN, i}$ in the area beyond the predetermined distance from the detected area. The user, bound to view the projection image by focusing on the area where a focus match has been achieved or a face has been recognized in the projection image, is not likely to be bothered by irregularities and the like present at the projection surface, which are visible at positions away from the area where the focus match has been achieved or where the face has been recognized. In this case, the projection image correction coefficient is determined (step S2 in FIG. 4) after reading the projection-target original image (step S3 in FIG. 4). It is because the area where the focus match has been achieved or where the face has been recognized through face recognition in the projection image must be detected before determining the projection image correction coefficient.

In addition, in conjunction with a projection image showing a menu screen, the distribution of the maximum brightness $Y_{MAX, i}$ and the distribution of the minimum brightness $Y_{MIN, i}$ may be calculated in an area within a predetermined distance from the area where characters representing the menu screen contents are displayed, without calculating the distributions of the maximum brightness $Y_{MAX, i}$ and the minimum brightness $Y_{MIN, i}$ in the area beyond the predetermined distance from the character display area. The user, bound to view the projection image by focusing on the characters displayed in the menu, is not likely to be bothered by irregularities and the like present at the projection surface, which are visible at positions away from the characters. In this case, the projection image correction coefficient is determined (step S2 in FIG. 4) after reading the projection-target original image (step S3 in FIG. 4). It is because the position of the menu must be detected before determining the projection image correction coefficient.

Alternative Embodiment 3

In the embodiment of the present invention described earlier, the distribution of the maximum brightness $Y_{MAX, i}$ and the distribution of the minimum brightness $Y_{MIN, i}$ in the projection surface are calculated in step 2. As an alternative, the distributions of the maximum brightness $Y_{MAX, i}$ and the minimum brightness $Y_{MIN, i}$ may be calculated after weighting the maximum brightness) $Y_{MAX, i}$ and the minimum brightness $Y_{MIN, i}$ in correspondence to the distance measured from the center of the projection image. For instance, as a single pixel within a predetermined maximum brightness range is found at the image center, it may be counted to represent a frequency value of 1 and the unit number of pixels to be counted to represent the frequency value of 1 may be increased further away from the image center (e.g., each 10 pixels within the predetermined maximum brightness range may be counted to represent the frequency value of 1). Then, based upon the weighted distributions of the maximum brightness $Y_{MAX, i}$ and the minimum brightness $Y_{MIN, i}$ the maximum brightness $Y_{MAX}$ and the minimum brightness $Y_{MIN}$ for the projected image may be determined. In this case, too, even if there is an extremely dark peripheral area at the projection surface 50, the correction quantity can be adjusted so as not to darken the projection image excessively, thereby assuring an improvement in the appearance of the projection image.

An area within the projection image where a focus match has been achieved or a face has been recognized may be detected and the distribution of the maximum brightness $Y_{MAX, i}$ and the distribution of the minimum brightness $Y_{MIN, i}$ may be calculated after weighting of the maximum brightness $Y_{MAX, i}$ and the minimum brightness $Y_{MIN, i}$ in correspondence to the distance from the detected area. The user, bound to view the projection image by focusing on the area where a focus match has been achieved or a face has been recognized in the projection image, is not likely to be bothered by irregularities and the like present at the projection surface, which are visible at positions away from the area where the focus match has been achieved or where the face has been recognized. In this case, the projection image correction coefficient is determined (step S2 in FIG. 4) after reading the projection-target original image (step S3 in FIG. 4). It is because the area where the focus match has been achieved or where the face has been recognized through face recognition in the projection image must be detected before determining the projection image correction coefficient.

In conjunction with a projection image showing a menu screen the distribution of the maximum brightness $Y_{MAX, i}$ and the minimum brightness $Y_{MIN, i}$ may be calculated after weighting the maximum brightness $Y_{MAX, i}$ and the minimum brightness $Y_{MIN, i}$ in correspondence to the distance from the area where characters representing the menu screen contents are displayed. The user, bound to view the projection image by focusing on the area where a focus match has been achieved or a face has been recognized in the projection image, is not likely to be bothered by irregularities and the like present at the projection surface, which are visible at positions away from the characters. In this case, the projection image correction coefficient is determined (step S2 in FIG. 4) after reading the projection-target original image (step S3 in FIG. 4). It is because the position of the menu must be detected before determining the projection image correction coefficient.

Alternative Embodiment 4

The projection-target original image may be corrected without taking into consideration a dark area present on the projection surface as long as a dark image portion of the original image is projected onto the dark area.

Figure 8:
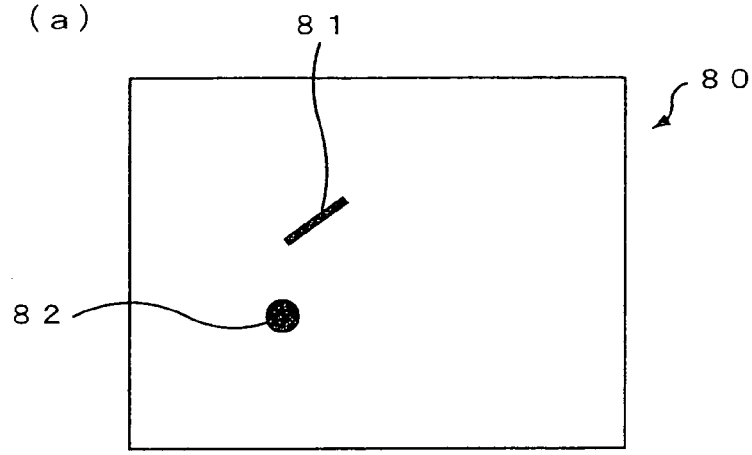
Figure 8:
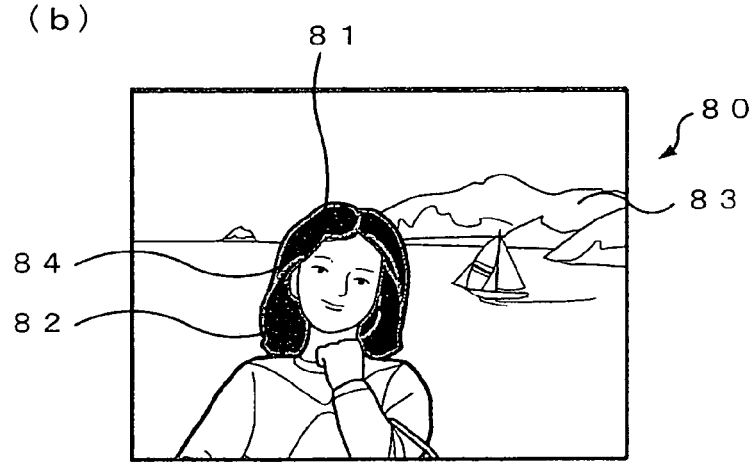

The image processing executed in alternative embodiment 4 is described in reference to FIG. 8. FIG. 8(*a*) shows a projection surface 80 onto which the projection image is to be projected. A rectangular stain 81 and a round stain 82 are present on the projection surface 80. If a dark portion 84 (the hair of the woman in a projection image 83) of the projection image 83 projected onto the projection surface 80 overlaps the stains 81 and 82, as shown in FIG. 8(*b*), the stains 81 and 82 are completely invisible even without any image processing executed on the projection-target original image. Accordingly, when calculating the correction quantity indicating the extent to which the projection-target original image is to be corrected, the brightness levels at the pixels corresponding to the dark areas 81 and 82 on the projection surface 80 do not need to be taken into consideration.

Figure 9:
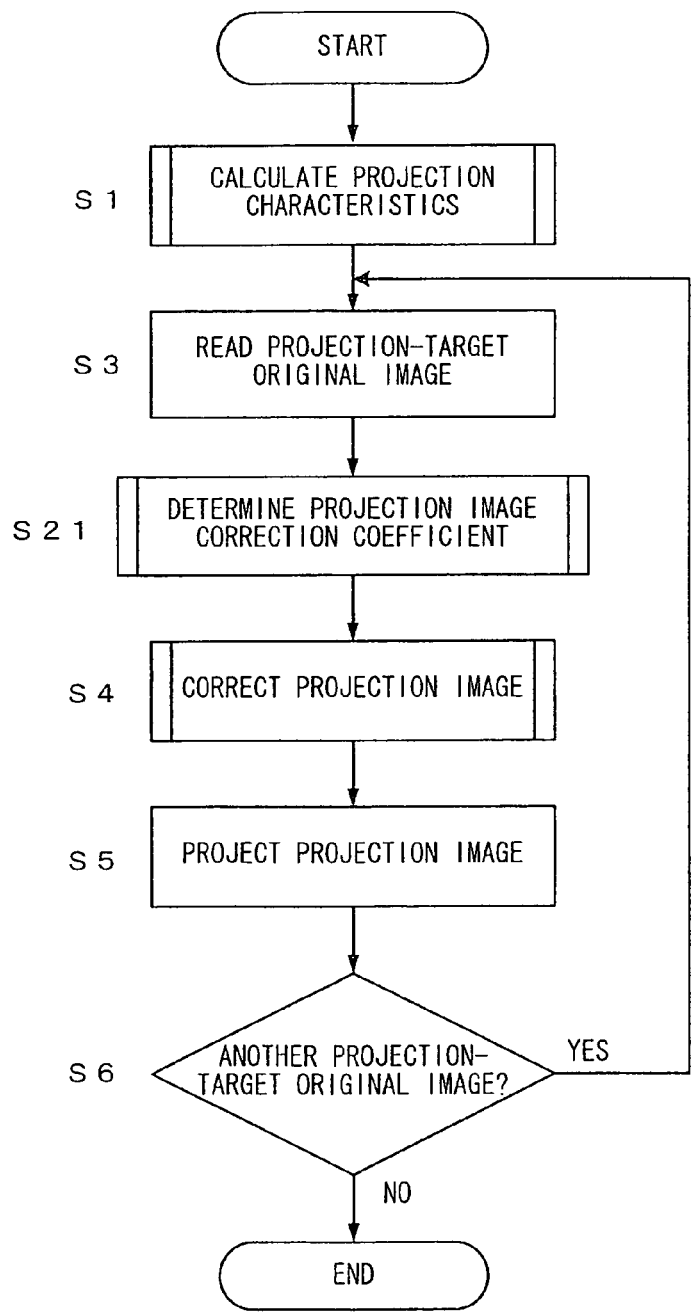

In reference to the flowchart presented in FIG. 9, the image processing executed in alternative embodiment 4 of the present invention is described. The processing in FIG. 9 is executed by the control circuit 101 based upon a program started up as the camera with projection capability 1 commences projection start processing. The same step numbers are assigned to steps in which image processing identical to that in FIG. 4 is executed and the following explanation focuses on image processing different from that shown in FIG. 4.

Following the processing in step S1, the operation proceeds to step S3. Upon executing the processing in step S3, the operation proceeds to step S21. In step S21, the projection image correction coefficient is determined. As in step S2 described earlier, a histogram is created and MIN($Y_{MAX, i}$) is calculated. In this step, the distribution of the brightness values within the image plane of a projection image obtained by projecting a white image onto the projection surface is compared with the distribution of brightness values within the plane of the projection-target original image. Then, the pixel values indicated in the projection-target original image at a pixel position at which the maximum brightness $Y_{MAX, i}$ matches MIN($Y_{MAX, i}$) are referenced, and if the brightness is low, the is pixel not regarded as a MIN($Y_{MAX, i}$) calculation target. The projection image pixel value evaluation is repeatedly executed in sequence in correspondence to individual pixel positions each indicating a low value for $Y_{MAX, i}$ and the minimum value MIN($Y_{MAX, i}$) for the maximum brightness that can be expressed at the corresponding position on the photographic image plane is determined for each pixel that does not indicate a low brightness value in the projection image. The operation then proceeds to step S4.

In addition, the distribution of the brightness values within the plane of the projection-target original image is analyzed and pixels indicating brightness values within a range accounting for a ratio equal to or higher than a predetermined value (e.g., a range accounting for 20%) are detected. Then, the minimum value MIN($Y_{MAX, i}$) may be determined based upon histograms of the brightness values indicated at pixels in the projection images obtained by projecting a white image and a black image, with the brightness values being correspond to the pixels having been detected based upon the distribution of the brightness values within the rejection-target original image. Namely, the minimum value MIN($Y_{MAX, i}$) for the maximum brightness and the like may be determined without taking into consideration any projection surface area corresponding to a dark image portion in the projection-target original image.

In alternative embodiment 4 described above, the dynamic range can be optimally adjusted in correspondence to the specificity of the projection-target original image even when the projection surface includes a dark area.

Alternative Embodiment 5

The different types of image processing described above may be executed in combination. For instance, the processing executed in alternative embodiment 3 and the processing executed in alternative embodiment 4 may be adopted in combination.

Alternative Embodiment 6

While the color gamut correction is executed as brightness range correction in the embodiments described above, similar color gamut correction may be executed along the chromaticity direction, e.g., for the Cr and Cb data in the YCrCb space or the chromaticity data (obtained by converting XYZ data to CIELAB data and using expression $C^* = \sqrt{(a^{*2} + b^{*2})}$). For instance, the projection surface may include a red-colored area assuming a high level of chromaticity. An attempt to correct a projection-target original image to be projected over such a red area will greatly reduce the dynamic range along the chromaticity direction resulting in the color of the projection image over the red area rendered substantially achromatic. Under such circumstances, correction is executed along the chromaticity direction in the embodiment by disregarding the chromaticity of the red area at the projection surface. As a result, while the red area may be somewhat noticeable, the projection image as a whole is viewed as an image of assuming a high dynamic range along the chromaticity direction as well.

Figure 12:
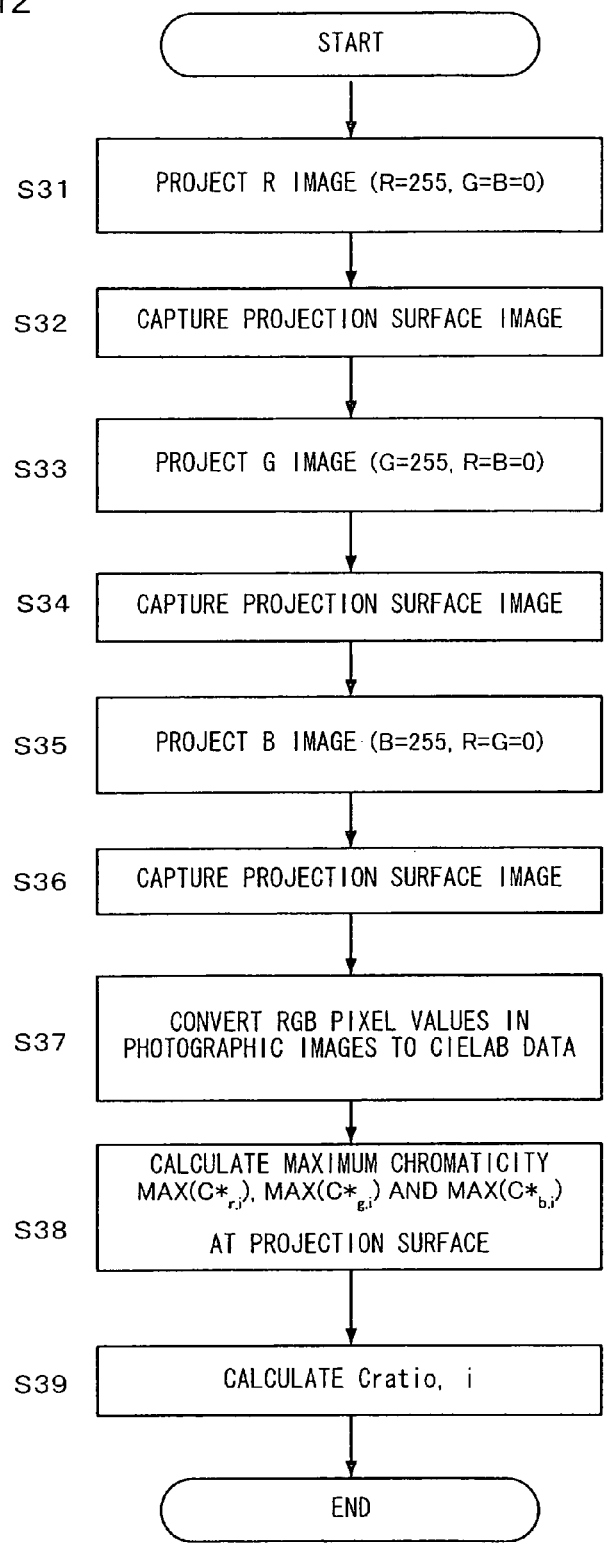
Figure 13:
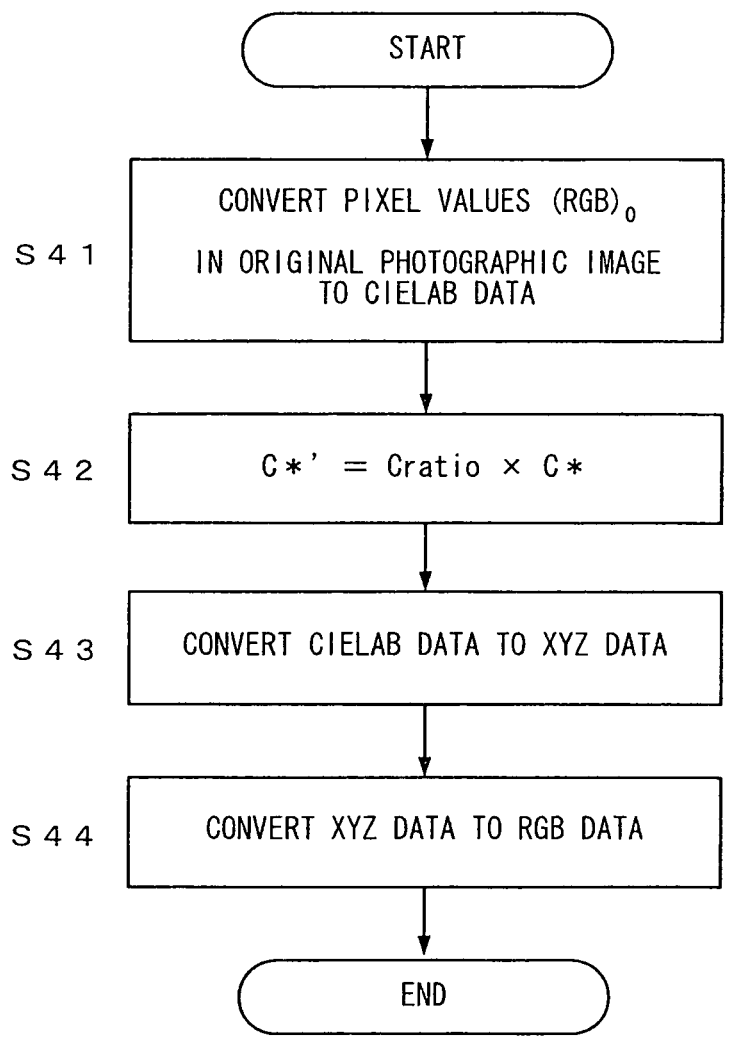

An example of a correction method is described in reference to FIGS. 12 and 13 and FIG. 4 in reference to which the first embodiment has been described. Photographic images obtained by capturing specific test images (an R image, a G image and a B image) are analyzed and the correction quantity of the projection-target original image is adjusted based upon the analysis results. In this situation, a maximum threshold value $C^*_{th}$ (h) for $C^*$ is determined and stored in correspondence to each hue (h) in advance. The following explanation of the correction method focuses on the difference from the processing (see FIG. 4) executed in the first embodiment.

FIG. 12 shows the processing executed in step S2 in FIG. 4. In step S31, an R image (R=255, G=B=0) is projected and in step S32, the projected image is photographed. Next, in step S33, a G image (G=255, R=B=0) is projected and in step S34, the projected image is photographed. In step S35, a B image (B=255, R=G=0) is projected and in step S36, the projected image is photographed. The pixel values in the images having been photographed in steps S32, S34 and S36 are converted to XYZ data, as expressed in (1), and are further converted to data in the CIELAB space. The chromaticity $C^*$ is calculated in the CIELAB space and the maximum chromaticity MAX $(C^*_{r,i})$, MAX$(C^*_{g,i})$ and MAX$(C^*_{b,i})$ within the respective photographic images are calculated.

In step S39, a chromaticity compression coefficient is calculated as expressed below in correspondence to each pixel, with $C^*_{r,th}$, $C^*_{g,th}$ and $C^*_{b,th}$ respectively representing the maximum chromaticity threshold values corresponding to the R image, the G image and the B image, before the processing ends.

$$Cratio, i = \text{MIN} \begin{pmatrix} \text{MIN}(C^*_{r,th}, \text{MAX}(C^*_{r,i}))/C^*_{r,i}, \\ \text{MIN}(C^*_{g,th}, \text{MAX}(C^*_{g,i}))/C^*_{g,i}, \\ \text{MIN}(C^*_{b,th}, \text{MAX}(C^*_{b,i}))/C^*_{b,i} \end{pmatrix}$$

It is to be noted that Cratio, i=1 for each pixel at which Cratio, i>1 is true.

Next, in reference to FIG. 13, the processing executed in step S4 in FIG. 4 is described. In step S41, the pixel values $(R_0, G_0, B_0)_i$ of the projection-target original image are converted to colorimetric values $(X,Y,Z)_i$ at the projection surface and then each set of pixel value data is converted to data in the CIELAB space.

In step S42, the chromaticity $C^*$ in the CIELAB space is calculated, and the chromaticity is then corrected so that $C^{*'}=Cratio \times C^*$ by using the correction coefficient Cratio, i having been calculated in step S43. The data in the CIELAB space are converted to XYZ data by using $C^{*'}$.

In step S44, corrected pixel values $(R,G,B)_i$ to be input to the projection unit 110 are calculated by using the expression below instead of expressions (6) and (7).

$$\begin{bmatrix} R^\gamma \\ G^\gamma \\ B^\gamma \end{bmatrix}_i = (M_i)^{-1} \cdot \left( \begin{bmatrix} X \\ Y \\ Z \end{bmatrix}_i - \begin{bmatrix} X_k \\ Y_k \\ Z_k \end{bmatrix}_i \right)$$

Alternative Embodiment 7

While a projection image correction coefficient is determined regardless of the particulars of the projection image and the projection image is corrected based upon this correction coefficient in the examples described above, different correction coefficients may be assumed at different positions within the projection surface. For instance, the projection image may be divided into areas each made up with a plurality of pixels and the projection image may be corrected in units of the individual areas. In such a case, a brightness histogram or a chromaticity histogram should be created in correspondence to each area and correction should be executed by determining a correction as has been explained in reference to the first embodiment and alternative embodiments 1~5 for each area. If a non-uniform pattern is present over the projection surface, the optimal correction for each projection surface position is enabled without running the risk of excessive correction. The projection image should be divided into separate areas in correspondence to the shape of the projection image.

As an alternative, instead of dividing the projection image into separate areas, a brightness histogram or a chromaticity histogram may be created in conjunction with nearby pixels (e.g., nearby pixels present within a specific area which is set in advance, ranging over, for instance, a 41×41 pixel area around the correction target pixel) present within a specific areal range around the correction target pixel and the correction may be executed based upon a correction coefficient determined, as has been described in reference to the first embodiment and alternative embodiments 1~5 in correspondence to each pixel.

Alternative Embodiment 8

While a uniform correction coefficient is assumed regardless of the particulars of the projection image in the embodiments having been described above, the correction coefficient may be altered in correspondence to the pixel value distribution (e.g., the brightness distribution or the color distribution) within the projection image plane. For instance, the projection image may be divided into separate areas and a brightness histogram or a chromaticity histogram may be created for the pixel values used in each area. Based upon the histogram, the brightness maximum $Y_{MAX}$ may be determined, as expressed in (5) presented in conjunction with the first embodiment, in correspondence to each area and correction may be executed as expressed in (6) and (7). Moreover, instead of dividing the projection image into separate areas, the correction coefficient may be adjusted in correspondence to each correction target pixel based upon the average brightness or the average color calculated for a predetermined areal range around the correction target pixel.

Alternative Embodiment 9

The image processing having been described in reference to any of the embodiments may be executed in an apparatus other than an electronic camera such as the camera with projection capability 1. For instance, the image processing may be executed at a projection apparatus such as a projector equipped with a camera used to photograph the projection image. Alternatively, the image processing may be executed at an electronic apparatus such as a portable telephone equipped with a projection capability and a photographing function. Moreover, the image processing having been described in any of the embodiments may be executed in an image processing system that includes a projection device that projects a projection image, a camera that photographs the projection image projected by the projection device and a computer that executes image processing based upon image data expressing the projection image photographed by the camera and transmits the image data expressing the projection image, having undergone the image processing, to the projection device.

While the stain 31 present on the projection surface 30 is rendered unnoticeable in the projection image projected for viewing through the embodiments of the present invention, any marks on the projection surface, inconsistency in the reflectance of the projection surface, patterns on the projection surface, uneven illumination at the projection unit 110, any adverse effect attributable to the illumination conditions in the surrounding environment and the like can be rendered less noticeable through the image processing executed in any of the embodiments of the present invention.

It is to be noted that the present invention may be adopted in conjunction with any projection surface as long as it is an object onto which an image can be projected, such as a wall or a whiteboard. In addition, while similar correction can be executed for a textured surface such as a fabric, the extent to which the appearance of the image projected onto a surface with significant indentations and protrusions is affected by the areas of shade created by the indentations and protrusions, changes depending upon the viewing angle, particularly if the viewer views the projected image at a significant angle. For this reason, it is more desirable to project the image onto a relatively smooth surface. As an alternative, it is desirable that restrictions may be imposed with regard to the viewing angle at which the viewer views the image or the projection image displayed for viewing may be altered in correspondence to the viewing angle.

In addition, if the projection surface includes an extremely bright area, e.g., an area where a light source is reflected, the appearance of the image over that area may become degraded depending upon the viewing direction in spite of the correction, since the appearance of the reflected bright spot differs in correspondence to different viewing angles. Moreover, a phenomenon referred to as black lifting tends to occur to a significant extent over an area where such a mirror surface reflection occurs, and an attempt at correction may result in excessive correction over such an area. Accordingly, the maximum threshold value $Y_{MAX, th}$ for the minimum brightness may be determined in advance for a darkening correction, with the minimum brightness Y0 set equal to $Y_{MIN}$ and also equal to $MIN(Y_{MAX, th}, MAX(Y_{MIN, i}))$. Moreover, by taking into consideration the effect of a surface reflection attributable to an extremely bright environmental factor such as a light source, an area where the minimum brightness $Y_{MIN, i}$ is greater than $Y_{MEN}$ when projecting the black image and the maximum brightness $Y_{MAX}$, is equal to 1 when projecting the white image may be indicated to the viewer as a projection NG area in the projection image or the correction processing may be executed by disregarding this particular area.

It is to be noted that the embodiment described above simply represent examples and the present invention is in no way limited to these examples as long as the functions characterizing the present invention remain intact.

The disclosure of the following priority application is herein incorporated by reference:

Japanese Patent Application No. 2007-163986 filed Jun. 21, 2007

The invention claimed is:

1. An electronic apparatus, comprising:
a projection unit that projects a test image and a projection-target original image onto a projection surface;
an imaging unit that captures a photographic image of the projection surface onto which the test image is projected by the projection unit;
a reflectance calculating unit that calculates a reflectance of the projection surface based upon the photographic image of the projection surface captured by the imaging unit; and
a control unit that adjusts a correction quantity representing an extent to which the projection-target original image is to be corrected, so as to correct influence of the reflectance on the projection-target original image, based upon pixel values of an area of the photographic image of the projection surface excluding an area of the projection surface where the reflectance is calculated as low by the reflectance calculating unit.

2. An electronic apparatus according to claim 1, wherein the control unit detects an area of the photographic image of the projection surface captured by the imaging unit where pixel values are lower than a predetermined threshold value as the area of low reflectance.

3. An electronic apparatus according to claim 2, wherein the threshold value corresponds to a predetermined ratio set in reference to a largest pixel value obtained from the photographic image.

4. An electronic apparatus according to claim 2, wherein the threshold value corresponds to a pixel value of a predetermined number of pixels, a count thereof starting with a pixel indicating a lowest reflectance toward a pixel indicating a highest reflectance.

* * * * *